(12) United States Patent
Dalsgaard et al.

(10) Patent No.: US 9,426,708 B2
(45) Date of Patent: Aug. 23, 2016

(54) ENHANCED MOBILITY FOR DEVICES USING MOVING RELAY

(75) Inventors: Lars Dalsgaard, Oulu (FI); Antti Piipponen, Vantaa (FI); Elena Virtej, Espoo (FI); Sassan Iraji, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/238,773

(22) PCT Filed: Aug. 9, 2012

(86) PCT No.: PCT/FI2012/050778
§ 371 (c)(1),
(2), (4) Date: Apr. 30, 2014

(87) PCT Pub. No.: WO2013/030438
PCT Pub. Date: Mar. 7, 2013

(65) Prior Publication Data
US 2014/0357276 A1    Dec. 4, 2014

Related U.S. Application Data

(63) Continuation of application No. 13/223,598, filed on Sep. 1, 2011, now abandoned.

(51) Int. Cl.
*H04W 36/00* (2009.01)
*H04W 36/32* (2009.01)
(Continued)

(52) U.S. Cl.
CPC ..... *H04W 36/0094* (2013.01); *H04W 36/0088* (2013.01); *H04W 36/32* (2013.01);
(Continued)

(58) Field of Classification Search
CPC .... H04W 36/30; H04W 36/18; H04W 36/08

USPC ........... 455/437, 436, 442, 432.1, 435.1; 370/331
See application file for complete search history.

(56) References Cited

U.S. PATENT DOCUMENTS

| 5,678,185 | A | 10/1997 | Chia |
| 9,107,134 | B1 * | 8/2015 | Belser ............... H04W 52/281 |

(Continued)

FOREIGN PATENT DOCUMENTS

| EP | 2051458 A2 | 4/2009 |
| EP | 2424321 A1 | 2/2012 |

(Continued)

OTHER PUBLICATIONS

International Search Report and Written Opinion received for corresponding Patent Cooperation Treaty Application No. PCT/FI2012/050778, dated Dec. 3, 2012, 18 pages.

(Continued)

*Primary Examiner* — Nghi H Ly
(74) *Attorney, Agent, or Firm* — Squire Patton Boggs (US) LLP (57) ABSTRACT

Enhanced mobility for devices using a moving relay, or in a moving relay environment, may be valuable in the Long Term Evolution (LTE) of the 3rd Generation Partnership Project (3 GPP). In particular, enhanced mobility procedures for user equipment (UE) can be useful with respect to a moving relay and the radio access network (RAN) interface (IF) between the user equipment and the moving relay. Thus, certain embodiments can improve the mobility procedures between moving relays and macro layer (stationary nodes, for example, eNodeBs). A method according to certain embodiments can include determining, by a user equipment, a stable average of a signal characteristic of a signal from a mobile access point. The method can also include limiting handover of the user equipment based on the stable average.

19 Claims, 7 Drawing Sheets

(51) Int. Cl.
*H04W 36/38* (2009.01)
*H04W 88/04* (2009.01)
*H04W 48/04* (2009.01)
*H04W 84/00* (2009.01)
*H04W 88/08* (2009.01)

(52) U.S. Cl.
CPC ........... *H04W36/385* (2013.01); *H04W 88/04* (2013.01); *H04W 48/04* (2013.01); *H04W 84/005* (2013.01); *H04W 88/08* (2013.01)

(56) References Cited

U.S. PATENT DOCUMENTS

| | | |
|---|---|---|
| 2003/0235165 A1 | 12/2003 | Wang |
| 2008/0014918 A1* | 1/2008 | Ito et al. ........................ 455/423 |
| 2009/0122760 A1* | 5/2009 | Kim ...................... H04W 48/20 370/331 |
| 2009/0275335 A1* | 11/2009 | Jalloul et al. .................. 455/437 |
| 2010/0173592 A1* | 7/2010 | Yamazaki ............ H04B 7/0689 455/69 |
| 2011/0038276 A1 | 2/2011 | Ninagawa |
| 2011/0124330 A1 | 5/2011 | Kojima |

FOREIGN PATENT DOCUMENTS

| | | |
|---|---|---|
| GB | 2242806 A | 10/1991 |
| WO | 2010133040 A1 | 11/2010 |
| WO | 2012011474 A1 | 1/2012 |

OTHER PUBLICATIONS

European Search Report application No. 12826767.1 dated Jul. 13, 2015.

Extended European Search Report dated Sep. 29, 2015, issued in corresponding Application No. EP12826767.1, 22 pages.

* cited by examiner

ENHANCED MOBILITY FOR DEVICES USING MOVING RELAY

RELATED APPLICATION

This application was originally filed as Patent Cooperation Treaty Application No. PCT/FI2012/050778 filed Aug. 9, 2012 which claims priority benefit to U.S. patent application Ser. No. 13/223,598, filed Sep. 1, 2011.

BACKGROUND

1. Field

Enhanced mobility for devices using a moving relay, or otherwise in a moving relay environment, may be valuable in the Long Term Evolution (LTE) of the $3^{rd}$ Generation Partnership Project (3GPP). In particular, enhanced mobility procedures for user equipment (UE) can be useful with respect to a moving relay and the radio access network (RAN) interface (IF) between the user equipment and the moving relay. Thus, certain embodiments can improve the mobility procedures between moving relays and macro layer (stationary nodes, for example, eNodeBs).

2. Description of the Related Art

Mobile relay nodes (MRNs) are conventionally treated the same as other relay nodes. In other words, there are not any special requirement in the conventional approach when it comes to mobility on the radio level. For example, there are no requirements in the current radio access network level implementations related to optimized mobility and mobile relay node with respect to various issues, such as cell detection, measurements, measurement reporting, cell reselection, and the like.

SUMMARY

A method according to certain embodiments includes determining, by a user equipment, a stable average of a signal characteristic of a signal from a mobile access point. The method also includes limiting handover of the user equipment based on the stable average.

According to certain embodiments, a method includes determining means for determining that a user equipment is within or near the coverage area of a mobile access point. The method also includes informing the user equipment that the mobile access point is an access point with mobile characteristics.

An apparatus includes, in certain embodiments, at least one memory including computer instructions and at least one processor. The at least one memory and computer instructions are configured to, with the at least one processor, cause the apparatus at least to determine a stable average of a signal characteristic of a signal from a mobile access point to a user equipment. The at least one memory and computer instructions are also configured to, with the at least one processor, cause the apparatus at least to limit handover of the user equipment based on the stable average.

In certain embodiments, an apparatus includes at least one memory including computer instructions and at least one processor. The at least one memory and computer instructions are configured to, with the at least one processor, cause the apparatus at least to determine that a user equipment is within or near the coverage area of a mobile access point. The at least one memory and computer instructions are also configured to, with the at least one processor, cause the apparatus at least to inform the user equipment that the mobile access point is an access point with mobile characteristics.

An apparatus includes, in certain embodiments, determining means for determining a stable average of a signal characteristic of a signal from a mobile access point to a user equipment. The apparatus also includes limiting means for limiting handover of the user equipment based on the stable average.

According to certain embodiments, an apparatus includes determining means for determining that a user equipment is within or near the coverage area of a mobile access point. The apparatus also includes informing means for informing the user equipment that the mobile access point is an access point with mobile characteristics.

A non-transitory computer-readable medium, according to certain embodiments, is encoded with instructions that, when executed in hardware perform a process. The process includes determining, by a user equipment, a stable average of a signal characteristic of a signal from a mobile access point. The method also includes limiting handover of the user equipment based on the stable average.

According to certain embodiments, a non-transitory computer-readable medium is encoded with instructions that, when executed in hardware perform a process. The process includes determining that a user equipment is within or near the coverage area of a mobile access point. The process also includes informing the user equipment that the mobile access point is an access point with mobile characteristics.

BRIEF DESCRIPTION OF THE DRAWINGS

For proper understanding of the invention, reference should be made to the accompanying drawings, wherein.

DETAILED DESCRIPTION

Moving relay nodes (sometimes simply referred to as "moving relays" or "mobile relays") may benefit from various enhancements when it comes to handling of radio access network (RAN) level mobility procedures. Examples of those enhancements may involve specialized measurements, measurement reporting, and techniques for inbound and outbound handover (HO) as well as similar techniques. The moving relays need not always be moving. For example, a moving relay can be installed in aircraft, train, hovercraft, boat, or other vehicle, which may be stationary at times.

A situation can arise in which a user equipment (UE) camped, idle or connected, to a moving or mobile relay node (MRN) while still being able to detect and possibly reselect to or report cells from a macro layer network. For example, the user equipment may be able to detect and possibly reselect to or report cells not in a mobile relay node group. Optimizations, in the sense of improved mobility procedure(s) and/or the area of mobility robustness and reduced signaling load over the air, can be helpful to reduce the system and user experience impact from having mobile relay nodes deployed.

Figure 1:
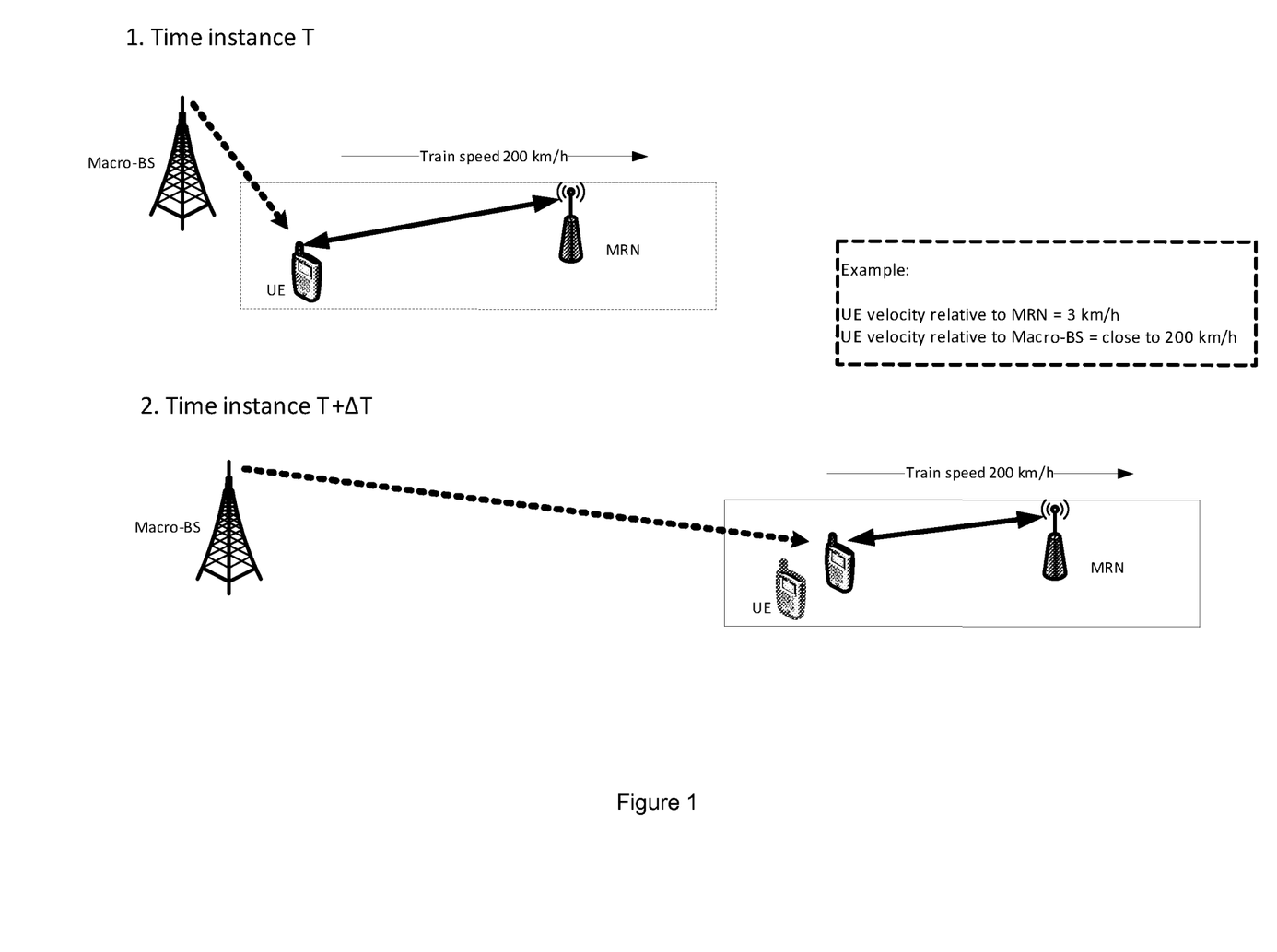
FIG. 1 illustrates a system according to certain embodiments.

FIG. 1 illustrates a system according to certain embodiments. As shown in FIG. 1, a system can include a macro base station (BS) in communication range of a user equipment (UE) that is aboard a train. The user equipment can be connected to a mobile relay node (MRN), which is also aboard the train. The train is moving at a speed of 200 km/h (about 125 mph). Thus, the user equipment's velocity relative to the macro base station (macro-BS) is quite high (depending on the position of the macro base station relative to the train). The velocity of the user equipment relative to the mobile relay node in the train, is much slower (typically, at most, walking speed—for example, 3 km/h or about 2 mph). This difference can be seen by comparison of the two points of time (T) and (T+ΔT). Therefore the mobile relay node reference signal received power (RSRP) changes slowly even if the train is moving fast.

Figure 2:
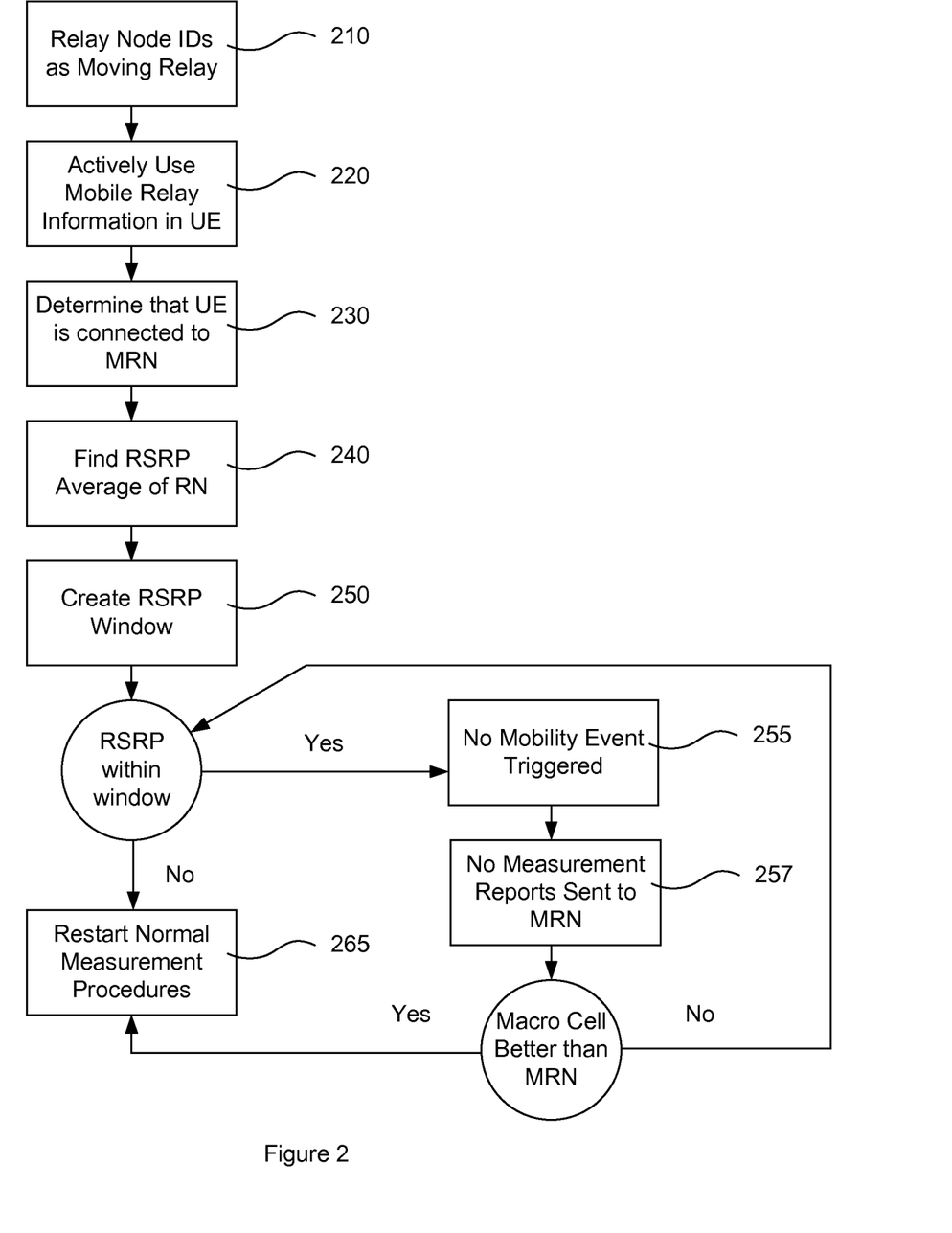
FIG. 2 illustrates a method according to certain embodiments.

FIG. 2 illustrates a method according to certain embodiments. As shown in FIG. 2, a relay node can identify itself as a moving relay at 210. The relay node can provide this identification to a user equipment (UE) or to a base station of a macro network, such as an eNodeB. The moving relay node (RN) information can be actively used in the user equipment, at 220, for optimizing the mobility procedure in order to improve the mobility robustness and reducing the network mobility signaling.

The information regarding the mobile relay node being a mobile node can be used in the system in various ways. When within mobile relay node coverage and camped/connected to it, the user equipment can have a relatively stable reference signal received power with respect to the relay node. That may be because the user equipment to/from mobile relay node link is a non-moving scenario or at least a slow-moving scenario, for example, walking speed. Thus, at 230, the user equipment may determine that it is connected to a mobile relay node.

The fact that the user equipment is connected to the mobile relay node can be used, at 240, by the user equipment to find reference signal received power average of the relay node. The user equipment can create, at 250, a reference signal received power window, of average reference signal received power (RSRP_a)+/− an acceptable amount of reference signal received power. As long as the relay node reference signal received power is within the reference signal received power window, no mobility events are triggered, at 255. Thus, no measurements reports may be sent to the relay node, at 257, and no handover (HO) mobility happens. The user equipment can remain connected to the relay node despite the surrounding changes.

Mobility procedures between moving relays and macro layer (stationary nodes) can be complex and can be implemented variously. The approach outlined above can be realized in many ways. Below is one illustration how the approach could be realized, but this example should not be considered limiting.

In this example, a user equipment in evolved universal terrestrial radio access network (E-UTRAN) radio resource controller (RRC) connected mode serves to illustrate an implementation. Similar approach can be applied also in idle mode, and can also be applied in other systems than E-UTRAN.

Figure 3:
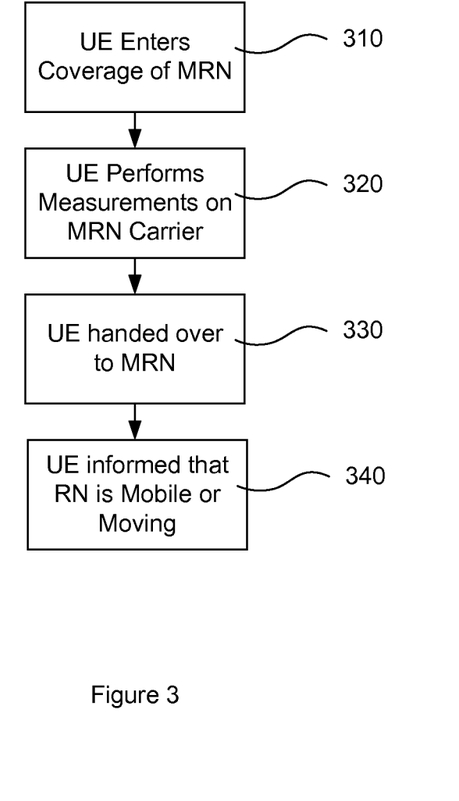
FIG. 3 illustrates an example implementation according to certain embodiments.

FIG. 3 illustrates an example implementation according to certain embodiments. As shown in FIG. 3, a user equipment in radio resource control connected mode can, at 310, entering an area covered by a moving relay node (MRN), which may also be referred to as a mobile relay station. The user equipment can, at 320, perform measurements on the carrier on which the mobile relay node is located—if mobile relay node is not deployed on the same carrier—in order to enable inbound mobility towards the mobile relay node if needed.

Subsequently, at 330, the user equipment can be handed over to the mobile relay node. Then, when the user equipment is connected to the mobile relay node (for example, following an inbound handover from a macro cell), the user equipment can be informed that it is now connected to a mobile relay node, at 340. This informing of the user equipment can be made through, for example, a system information (SIB) or dedicated signaling (for example, measurement configuration or handover command). This information can be provided to the user equipment by the base station of the macro cell or by the mobile relay node.

The moving relay node information, received by the user equipment, can be actively used in the user equipment for optimizing the mobility procedure. The fact that the link between the user equipment and mobile relay node will (maybe after some settling time) become stable and equal a non-moving scenario (since the user equipment and mobile relay node are moving at similar rates of speed), can be used to enhance the otherwise normally continuously ongoing mobility procedures. Specifically, this fact can be taken into account to reduce the load from the normal mobility procedures on the user equipment and on the network.

The user equipment can actively use this information in order to improve mobility related procedures in the following ways, referring again to FIG. 2. The user equipment connected to the mobile relay node can measure serving cell (MRN) to find, for example, average reference signal received power or other characteristics of the relay node. Based on the averaged value of, for example, reference signal received power of the mobile relay node, the user equipment can determine a stable reference signal received power average value, at 240. This stable average can be based on the user equipment's own measurements and not signaled by network. As an alternative, the stable average can be based on the measurements of another user equipment. For example, if a cluster of user equipments are associated with a single user, the measurements made by one or several of the user equipments can be shared with the other user equipments in the cluster.

One reason that a user equipment specific average is useful, is that the stabilized reference signal received power average point may depend heavily on user equipment placement relative to the mobile relay node, particularly because the mobile relay node may have lower power than a typical macro cell base station, such as an eNodeB and because the mobile relay node may be moving at a high speed relative to fixed nodes in the system, but may be relatively motionless with respect to the user equipment.

When the user equipment has obtained a stable reference signal received power average point, which may be referred to as RSRP_a, it can define an reference signal received power window, at 250. The window can be defined in terms of RSRP_lower<=RSRP_a<=RSRP_higher, where RSRP_a is a stable reference signal received power average point, RSRP_lower is a lower boundary of the window, and RSRP_higher is the upper boundary of the window.

The relative boundaries RSRP_lower and RSRP_higher do not have to be calculated by the user equipment. Instead the relative boundaries RSRP_lower and RSRP_higher can be controlled and signaled by the network (for example, either the mobile relay node or a macro eNode B) to the user equipment. Thus, the network can provide the user equipment with either a single magnitude for the window (for example, the overall size of the window or the difference between RSRP_a and RSRP_higher) or the particular values for RSRP_lower and RSRP_higher. Alternatively, the network can provide a factor to the user equipment so that the user equipment will calculate a window of a size that is based on the factor provided by the network.

When the reference signal received power window has been defined, the user equipment can use this information as follows. As long as instantaneous reference signal received power of the mobile relay node is within the reference signal received power window, at 255, no event triggering happens (no mobility events, in particular). Additionally, at 257, no measurement reports are sent to the serving cell (MRN). Thus, no handover mobility occurs based on measurement reporting and the user equipment will remain with the relay node despite the surrounding changes. Of course, there does not need to be any restriction on handover occurring for other reasons (such as to obtain different services).

Figure 4:
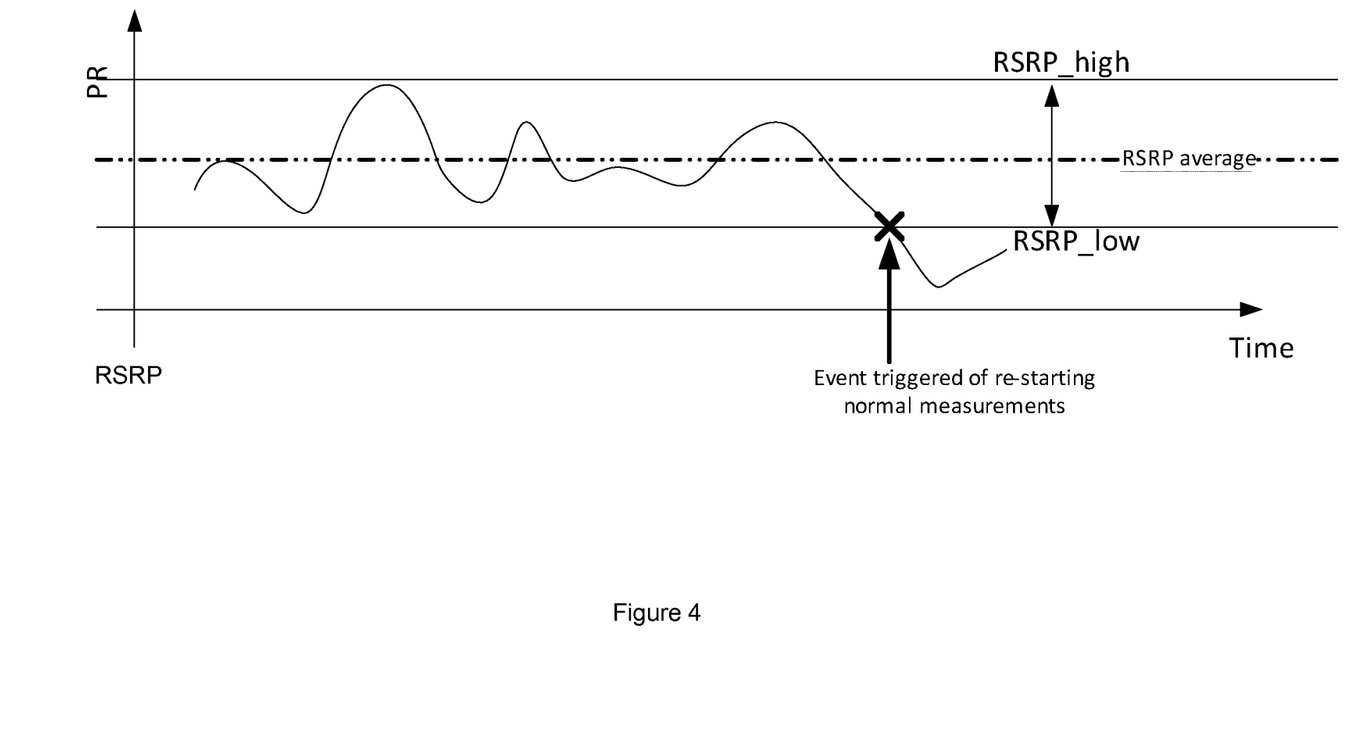
FIG. 4 illustrates a reference signal received power window for mobile relay node reference signal received power.

If the measured reference signal received power goes outside the reference signal received power window, the user equipment can, at 265, re-start normal measurement procedures, for example, as configured by network. Thus, for example, when macro cell goes above max window level/threshold above, this would lead to handover/radio link failure (RLF). FIG. 4 illustrates a departure from the window, and will be discussed below.

When the reference signal received power window has been defined, but the reference signal received power difference between the mobile relay node link and, for example, macro cell reference signal received power exceed a given threshold, then normal mobility procedures can be triggered at 265. This approach of triggering normal mobility procedures when a macro cell appears to have better performance can be done in order to be able to manage interference. However, it may be valuable to require both a time and performance threshold. In other words, it may be valuable to require that the macro cell outperform the mobile relay node for at least some minimum amount of time before triggering normal measurement and mobility procedures at 265.

FIG. 4 illustrates an reference signal received power window for mobile relay node reference signal received power. As shown in FIG. 4, the reference signal received power can fluctuate around an average reference signal received power. However, when the reference signal received power goes outside a pre-defined window (RSRP_low to RSRP_high centered around RSRP_average), the user equipment can re-start normal measurements. It should be noted that although the window is shown as symmetrical, the window can be generated asymmetrically, since a very high received power from the mobile relay node may be more tolerable than a very low received power from the mobile relay node.

Certain embodiments can provide various features. For example, certain embodiments can reduce mobility signaling, measurements, and cell changes in a network employing mobile relay nodes. Moreover, certain embodiments can permit a user equipment to stay linked to a mobile relay node when within stable conditions.

Figure 5:
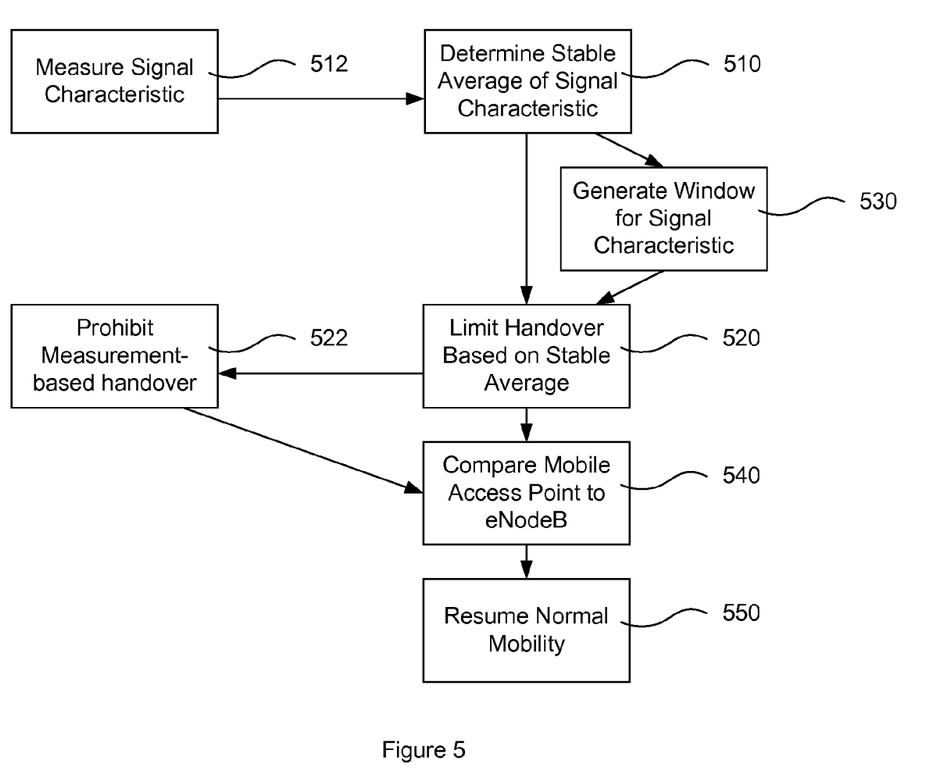
FIG. 5 illustrates a method according to certain embodiments.

FIG. 5 illustrates a method according to certain embodiments. As shown in FIG. 5, a method can include, at 510, determining, by a user equipment, a stable average of a signal characteristic of a signal from a mobile access point. The signal characteristics can include, for example, reference signal received power. The determining can be entirely done by the user equipment or the user equipment can receive assistance from another node. For example, at 512, the determining can include measuring the signal by the user equipment.

The method can also include, at 520, limiting handover of the user equipment based on the stable average. Limiting handover can include, at 522, prohibiting measurement-based handover.

The method can further include, at 530, generating a window for the signal characteristic based on the stable average, wherein limiting handover comprises limiting handover only when the signal remains within the window.

The method additionally include, at 540, comparing a signal characteristic of a macro cell to the signal characteristic of the mobile access point, and, at 550, resuming normal handover procedures when the characteristics of the macro cell exceed those of the mobile access point by a predetermined amount.

Figure 6:
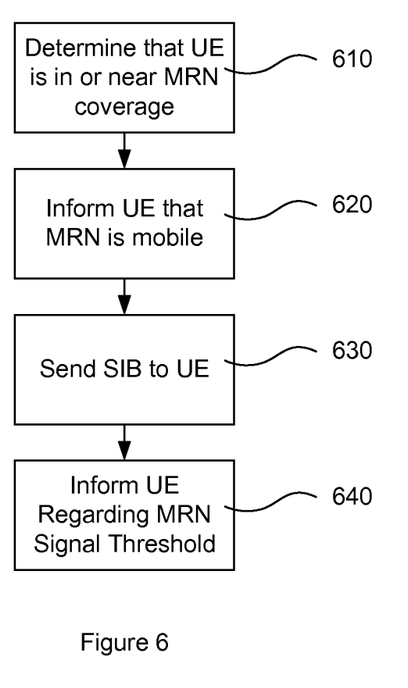
FIG. 6 illustrates another method according to certain embodiments.

FIG. 6 illustrates a method according to alternative embodiments of the present invention. As shown in FIG. 6, a method can include determining, at 610, that a user equipment is within or near the coverage area of a mobile access point. The method can also include, at 620, informing the user equipment that the mobile access point is an access point with mobile characteristics. The informing the user equipment can include, at 630, sending a system information block, or by other signaling means, to the user equipment, wherein the system information (or other signaling) comprises an indicator that the mobile access point has mobile characteristics. The method can further include, at 640, informing the user equipment regarding a threshold (such as the size of a window) for a signal characteristic for which the user equipment is configured to do determine a stable average. This method may be performed by a mobile relay node or an evolved node B or by a combination of the two. Additionally, this informing the user equipment may be performed in connection with providing the user equipment with information about neighbor nodes.

Figure 7:
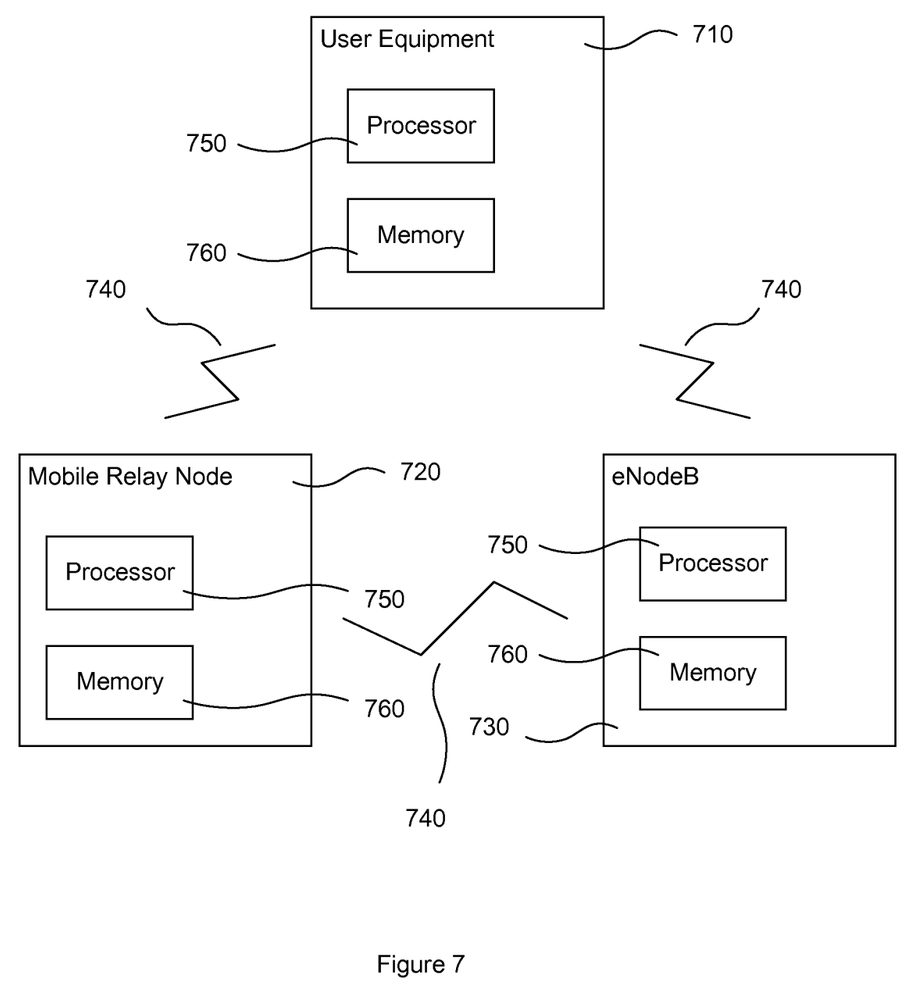
FIG. 7 illustrates a system according to certain embodiments.

FIG. 7 illustrates a system according to certain embodiments. As shown in FIG. 7, a system can include user equipment 710, mobile relay node 720, and eNodeB 730. The various devices or nodes in the system may be able to communicate with one another over wireless links 740, and may be provided with appropriate antennas, receivers, transmitters, and network interfaces in order to be able to accomplish such communications.

Each of the devices or nodes in the system can be equipped with, among other things, at least one processor 750 and at least one memory 760, which can include computer instructions.

The at least one processor 750 can be variously embodied by any computational or data processing device, such as a central processing unit (CPU) or application specific integrated circuit (ASIC). The at least one processor 750 can, for example, be implemented as one or a plurality of controllers.

The at least one memory 760 can be any suitable storage device, such as a non-transitory computer-readable medium. For example, a hard disk drive (HDD) or random access memory (RAM) can be used in the at least one memory 760.

The at least one memory 760 can be on a same chip as the at least one processor 750, or may be separate from the at least one processor 750.

The computer instructions may be any suitable form of computer program code. For example, the computer instructions may be a compiled or interpreted computer program.

The at least one memory 760 and computer instructions can be configured to, with the at least one processor 750, cause a hardware apparatus (for example, user equipment 710, mobile relay node 720, or eNodeB 730) to perform a process, such as the processes shown in FIGS. 2, 3, 5, and 6 or any other process described herein.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one memory including computer instructions; and
   at least one processor,
   wherein the at least one memory and computer instructions are configured to, with the at least one processor, cause the apparatus at least to
   determine a signal characteristic of a received signal,
   determine a stable average of the signal characteristic of the received signal from a mobile access point to a user equipment, and
   limit handover of the user equipment when the signal characteristic remains within a window based on the stable average, wherein the window is defined with a lower boundary and an upper boundary based on the stable average.

2. The apparatus of claim 1, wherein the at least one memory and computer instructions are also configured to, with the at least one processor, cause the apparatus at least to generate a window for the signal characteristic based on the stable average.

3. The apparatus of claim 1, wherein the at least one memory and computer instructions are configured to, with the at least one processor, cause the apparatus at least to determine the stable average by measuring the signal by the user equipment.

4. The apparatus of claim 1, wherein the at least one memory and computer instructions are configured to, with the at least one processor, cause the apparatus at least to limit handover by prohibiting measurement-based handover.

5. The apparatus of claim 1, wherein the at least one memory and computer instructions are also configured to, with the at least one processor, cause the apparatus at least to
   compare a signal characteristic of a macro cell to the signal characteristic of the mobile access point, and
   resume normal handover procedures when the characteristics of the macro cell exceed those of the mobile access point by a predetermined amount.

6. The apparatus of claim 1, wherein the mobile access point comprises a relay node.

7. The apparatus of claim 1, wherein the signal characteristic is reference signal received power of the signal.

8. The apparatus of claim 1, wherein the at least one memory and computer instructions are further configured to, with the at least one processor, cause the apparatus at least to receive information regarding a size of the window for which the user equipment is configured to determine the stable average.

9. The apparatus of claim 1, wherein the at least one memory and computer instructions are further configured to, with the at least one processor, cause the apparatus at least to determine that the user equipment is within or near a coverage area of a mobile access point, wherein the mobile access point is an access point with mobile characteristics.

10. The apparatus of claim 1, wherein the at least one memory and computer instructions are further configured to, with the at least one processor, cause the apparatus at least to receive a system information block, or other signaling, wherein the system information or other signaling comprises an indicator that the mobile access point has mobile characteristics.

11. A method, comprising:
    determining a signal characteristic of a received signal;
    determining, by a user equipment, a stable average of the signal characteristic of the received signal from a mobile access point; and
    limiting handover of the user equipment when the signal characteristic remains within a window, wherein the window is defined with a lower boundary and an upper boundary based on the stable average.

12. The method of claim 11, further comprising:
    generating the window for the signal characteristic based on the stable average.

13. The method of claim 11, further comprising:
    comparing a signal characteristic of a macro cell to the signal characteristic of the mobile access point, and
    resuming normal handover procedures when the characteristics of the macro cell exceed those of the mobile access point by a predetermined amount.

14. The method of claim 11, further comprising:
    determining the stable average by measuring the signal by the user equipment.

15. The method of claim 11, further comprising:
    limiting handover by prohibiting measurement-based handover.

16. The method of claim 11, wherein the signal characteristic is reference signal received power of the signal.

17. The method of claim 11, further comprising:
    receiving information regarding a size of the window for which the user equipment is configured to determine the stable average.

18. The method of claim 11, further comprising:
    determining that the user equipment is within or near a coverage area of a mobile access point, wherein the mobile access point is an access point with mobile characteristics.

19. The method of claim 11, further comprising:
    receiving a system information block, or other signaling, wherein the system information or other signaling comprises an indicator that the mobile access point has mobile characteristics.

* * * * *